A system including a monitoring unit to monitor in-stream shared content and content served via the online service to a user; an in-stream shared content receiving unit to receive information about the in-stream shared content served with the content; a companion shared content selection unit to select the companion shared content based on the monitored in-stream shared content and content, and the received information; and a transmitting unit to transmit the selected companion shared content to the online service.

(12) United States Patent
Kerns et al.

(10) Patent No.: US 10,171,538 B1
(45) Date of Patent: *Jan. 1, 2019

(54) ADAPTIVELY SERVING COMPANION SHARED CONTENT

(71) Applicant: GOOGLE INC., Mountain View, CA (US)

(72) Inventors: Jamieson Robert Kerns, Santa Moncia, CA (US); Shiva Rama Krishna Jaini, Santa Clara, CA (US); Nicola Ann Crane, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/477,878

(22) Filed: Apr. 3, 2017

Related U.S. Application Data

(63) Continuation of application No. 13/917,808, filed on Jun. 14, 2013, now Pat. No. 9,634,910.

(51) Int. Cl.
| | |
|---|---|
| *G06F 15/16* | (2006.01) |
| *H04L 12/26* | (2006.01) |
| *H04L 29/06* | (2006.01) |
| *H04L 29/08* | (2006.01) |

(52) U.S. Cl.
CPC ........ *H04L 65/602* (2013.01); *H04L 65/4069* (2013.01); *H04L 67/22* (2013.01)

(58) Field of Classification Search
CPC ... H04L 65/602; H04L 65/4069; H04L 67/22; H04L 43/04; H04N 21/4316
See application file for complete search history.

(56) References Cited

U.S. PATENT DOCUMENTS

| | | | |
|---|---|---|---|
| 8,611,428 B1 | 12/2013 | Huang et al. | |
| 8,769,559 B2 | 7/2014 | Moon et al. | |
| 8,856,825 B1 | 10/2014 | Mick, Jr. et al. | |
| 9,113,214 B2 * | 8/2015 | Andrews, II | G06Q 30/02 |
| 9,124,631 B2 * | 9/2015 | Harding | G06Q 30/0247 |
| 9,237,367 B2 * | 1/2016 | Terpe | H04N 21/4126 |
| 9,332,302 B2 * | 5/2016 | Briggs | H04N 21/435 |
| 9,369,740 B1 * | 6/2016 | Funk | H04N 21/20 |
| 9,451,010 B2 * | 9/2016 | Spitz | G06Q 30/0601 |
| 9,607,330 B2 * | 3/2017 | Spitz | G06Q 30/06 |
| 9,697,536 B2 * | 7/2017 | Arankalle | G06Q 30/0251 |
| 9,706,253 B1 * | 7/2017 | Funk | H04N 21/44222 |
| 9,769,544 B1 * | 9/2017 | Pau | H04N 21/85 |
| 9,785,980 B2 * | 10/2017 | Harding | G06Q 30/0277 |

(Continued)

FOREIGN PATENT DOCUMENTS

| | | | | |
|---|---|---|---|---|
| KR | 20040010905 A * | 2/2004 | | |
| WO | WO 0203227 A2 * | 1/2002 | | G06Q 30/02 |
| WO | WO 2008020276 A2 * | 2/2008 | | H04N 7/10 |

*Primary Examiner* — Kostas J Katsikis
(74) *Attorney, Agent, or Firm* — Lowenstein Sandler LLP

(57) ABSTRACT

A system including a monitoring unit to monitor in-stream shared content and content served via the online service to a user; an in-stream shared content receiving unit to receive information about the in-stream shared content served with the content; a companion shared content selection unit to select the companion shared content based on the monitored in-stream shared content and content, and the received information; and a transmitting unit to transmit the selected companion shared content to the online service.

16 Claims, 4 Drawing Sheets

(56) References Cited

U.S. PATENT DOCUMENTS

| | | | |
|---|---|---|---|
| 9,872,069 B1* | 1/2018 | Funk | H04N 21/442 |
| 9,875,489 B2* | 1/2018 | Spitz | H04N 21/25866 |
| 9,887,941 B1* | 2/2018 | Guarraci | H04L 51/046 |
| 2007/0038931 A1 | 2/2007 | Allaire et al. | |
| 2007/0300280 A1* | 12/2007 | Turner | G06Q 30/02 |
| | | | 725/135 |
| 2008/0109306 A1* | 5/2008 | Maigret | G06F 21/10 |
| | | | 705/14.46 |
| 2008/0141367 A1 | 6/2008 | Ganz et al. | |
| 2008/0148316 A1 | 6/2008 | Kang et al. | |
| 2008/0155590 A1* | 6/2008 | Soukup | H04N 7/17336 |
| | | | 725/34 |
| 2008/0201751 A1* | 8/2008 | Ahmed | H04N 21/4312 |
| | | | 725/109 |
| 2008/0276269 A1 | 11/2008 | Miller et al. | |
| 2008/0319852 A1* | 12/2008 | Gardner | G06Q 30/02 |
| | | | 705/14.4 |
| 2008/0320512 A1* | 12/2008 | Knight | G06Q 30/02 |
| | | | 725/32 |
| 2009/0006191 A1* | 1/2009 | Arankalle | G06Q 30/02 |
| | | | 705/14.71 |
| 2009/0006375 A1* | 1/2009 | Lax | G06Q 30/02 |
| 2009/0024927 A1 | 1/2009 | Schrock et al. | |
| 2009/0063283 A1* | 3/2009 | Kusumoto | G06Q 30/02 |
| | | | 705/14.25 |
| 2009/0144129 A1* | 6/2009 | Grouf | G06F 17/3005 |
| | | | 705/14.42 |
| 2009/0150210 A1 | 6/2009 | Athsani et al. | |
| 2009/0172727 A1* | 7/2009 | Baluja | G06Q 30/00 |
| | | | 725/34 |
| 2009/0222851 A1* | 9/2009 | Talmi | H04N 7/17336 |
| | | | 725/32 |
| 2009/0328113 A1* | 12/2009 | van de Klashorst | G06Q 30/00 |
| | | | 725/87 |
| 2010/0287580 A1* | 11/2010 | Harding | G06Q 30/0247 |
| | | | 725/14 |
| 2011/0004517 A1 | 1/2011 | Soto et al. | |
| 2011/0078728 A1 | 3/2011 | Fu et al. | |
| 2011/0113480 A1 | 5/2011 | Ma et al. | |
| 2011/0264768 A1 | 10/2011 | Walker et al. | |
| 2012/0047542 A1* | 2/2012 | Lewis | H04N 21/44016 |
| | | | 725/97 |
| 2012/0158461 A1* | 6/2012 | Aldrey | G06Q 30/0201 |
| | | | 705/7.35 |
| 2012/0158511 A1* | 6/2012 | Lucero | G06Q 30/0251 |
| | | | 705/14.64 |
| 2012/0278725 A1 | 11/2012 | Gordon et al. | |
| 2013/0019187 A1* | 1/2013 | Hind | H04L 65/403 |
| | | | 715/753 |
| 2013/0031593 A1 | 1/2013 | Booth | |
| 2013/0104024 A1* | 4/2013 | Rajkumar | G06F 17/30899 |
| | | | 715/234 |
| 2013/0151352 A1* | 6/2013 | Tsai | G06Q 30/0641 |
| | | | 705/14.73 |
| 2013/0166652 A1 | 6/2013 | Conway et al. | |
| 2013/0198013 A1 | 8/2013 | Shehan et al. | |
| 2013/0227607 A1* | 8/2013 | Saltonstall | H04N 21/458 |
| | | | 725/35 |
| 2013/0247081 A1 | 9/2013 | Vinson et al. | |
| 2013/0254716 A1 | 9/2013 | Mishra | |
| 2013/0291014 A1 | 10/2013 | Mick, Jr. et al. | |
| 2013/0311309 A1* | 11/2013 | Napchi | G06Q 30/0277 |
| | | | 705/14.73 |
| 2014/0067828 A1* | 3/2014 | Archibong | H04L 65/4084 |
| | | | 707/748 |
| 2014/0096152 A1 | 4/2014 | Ferens et al. | |
| 2014/0156405 A1 | 6/2014 | Ganz et al. | |
| 2014/0201295 A1 | 7/2014 | Collins et al. | |
| 2014/0359656 A1* | 12/2014 | Banica | H04N 21/812 |
| | | | 725/32 |
| 2015/0071601 A1 | 3/2015 | Dabous et al. | |
| 2015/0324827 A1 | 11/2015 | Upstone et al. | |
| 2015/0324869 A1* | 11/2015 | Harding | G06Q 30/0247 |
| | | | 705/14.73 |
| 2017/0300965 A1* | 10/2017 | Arankalle | G06Q 30/02 |

* cited by examiner

ADAPTIVELY SERVING COMPANION SHARED CONTENT

CROSS-REFERENCE TO RELATED APPLICATION

This application is a continuation of U.S. patent application Ser. No. 13/917,808, filed on Jun. 14, 2013, the entire contents of which is hereby incorporated by reference in its entirety.

BACKGROUND

A variety of online services may retrieve media from a source, such as a media sharing web site or a service that provides media to an application on a user device. The online services may distribute the media to users that access the online services. The media may be content, such as a combination of video, audio, or text.

The content may be sourced from users of the online services, or from publishers of media. The online services may augment the serving of the content with shared content. The shared content may be presented before, during or after the presentation of the content. Alternatively, or in addition to, the shared content may be presented alongside the presentation of the content. The shared content may be associated with meta information, and in response to a viewer of the content accessing the meta information, the viewer may be redirected to another online service.

In addition to shared content being provided, companion shared content may also be introduced to the viewer of the content. For example, the shared content may be presented in a viewing area reserved for the content. In this case, the shared content may be, for example, an in-stream media item played before, during or after the content.

The companion shared content may be presented in an area not occupied by the viewing area used for the content. Thus, the companion shared content may be presented in a format not similar to the content. For example, if the content is presented in a popular video format, the companion shared content may be presented as a hypertext markup language (html), a flash container, or any format capable of being consumed by the viewer of the content.

Thus, by providing in-stream shared content and companion shared content to a viewer of content, multiple routes of augmenting the content is achieved. Further, because the in-stream shared content may be served in a format similar to the content, the companion shared content may be served in a unique and separate way.

In order to provide the viewer of the content control and flexibility, the in-stream shared content may be served with an option to skip viewing the in-stream shared content. Thus, if the viewer is not interested in the in-stream shared content being served in-stream along with the content, a prompt to skip the viewing of the shared content may be provided at a predetermined time. In this way, an online service may retain the viewer by preventing the viewer from being disinterested in the in-stream shared content being provided.

SUMMARY

A system and method for adaptively serving companion shared content via an online service are provided. The system includes a monitoring unit to monitor in-stream shared content and content served via the online service to a user; an in-stream shared content receiving unit to receive information about the in-stream shared content served with the content; a companion shared content selection unit to select the companion shared content based on the monitored in-stream shared content and content, and the received information; and a transmitting unit to transmit the selected companion shared content to the online service.

DESCRIPTION OF THE DRAWINGS

The detailed description refers to the following drawings, in which like numerals refer to like items, and in which.

DETAILED DESCRIPTION

Figure 1:
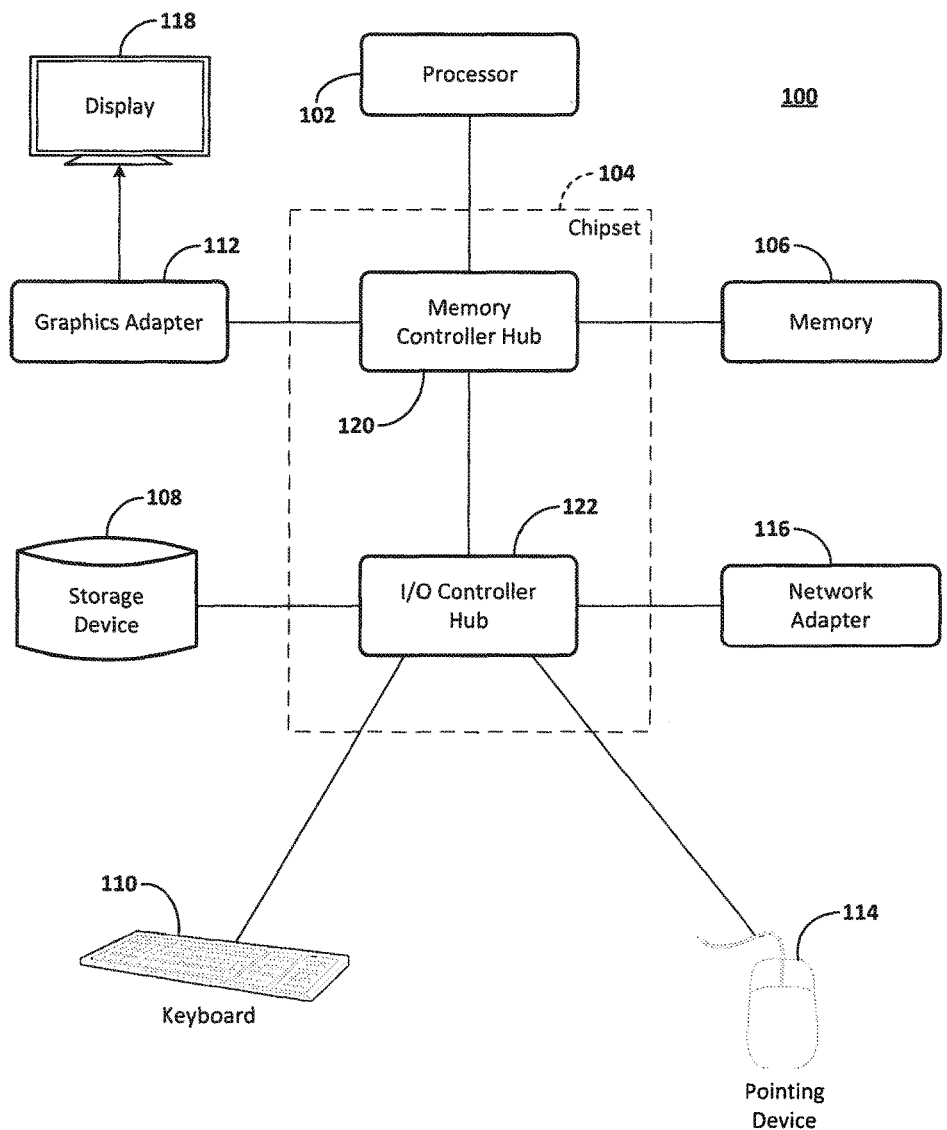
FIG. 1 is a block diagram illustrating an example computer.

An online service that serves content, such as videos, audio, text or a combination thereof may augment the content with shared content that is in-stream. Additionally, or alternatively to, the online service may serve companion shared content. The companion shared content is served alongside the content. The companion shared content may be provided in a format similar or different than the format employed to present the content and in-stream shared content.

For example, the companion shared content may be provided as html. The companion shared content may contain meta data, such as links and other html elements in order to convey information pertaining to the companion shared content's theme.

If the companion shared content is directed to a consumer product, the companion shared content may contain text associated with the consumer product, a link directing the viewer of the content to an external site, or any sort of information employed to educate or attract the viewer to the existence of the consumer product.

Disclosed herein are methods and systems for adaptively serving companion shared content. The companion shared content may be adaptively served in a certain way based on a user's interaction with an online service. Alternatively, or in addition to, the companion shared content may be adaptively served based on a user's perceived interest of other shared content, such as an in-stream shared content. Further, the companion shared content may be adaptively served based on other aspects of the user's interaction with content, such as preferences indicated by the user or a theme associated with the content.

In essence, by adaptively serving companion shared content, the companion shared content may be presented in a way that encourages the user of an online service to access or be influenced by the companion shared content. Thus, the online service may realize a greater return on investment associated with the companion shared content due to the companion shared content being more effective at attracting the viewer of the content.

In situations in which the methods and systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

FIG. 1 is a block diagram illustrating an example computer 100. The computer 100 includes at least one processor 102 coupled to a chipset 104. The chipset 104 includes a memory controller hub 120 and an input/output (I/O) controller hub 122. A memory 106 and a graphics adapter 112 are coupled to the memory controller hub 120, and a display 118 is coupled to the graphics adapter 112. A storage device 108, keyboard 110, pointing device 114, and network adapter 116 are coupled to the I/O controller hub 122. Other embodiments of the computer 100 may have different architectures.

The storage device 108 is a non-transitory computer-readable storage medium such as a hard drive, compact disk read-only memory (CD-ROM), DVD, or a solid-state memory device. The memory 106 holds instructions and data used by the processor 102. The pointing device 114 is a mouse, track ball, or other type of pointing device, and is used in combination with the keyboard 110 to input data into the computer system 100. The graphics adapter 112 displays images and other information on the display 118. The network adapter 116 couples the computer system 100 to one or more computer networks.

The computer 100 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 108, loaded into the memory 106, and executed by the processor 102.

The types of computers used by the entities and processes disclosed herein can vary depending upon the embodiment and the processing power required by the entity. The computer 100 may be a mobile device, tablet, smartphone or any sort of computing element with the above-listed elements. For example, a video corpus, such as a hard disk, solid state memory or storage device, might be stored in a distributed database system comprising multiple blade servers working together to provide the functionality described herein. The computers can lack some of the components described above, such as keyboards 110, graphics adapters 112, and displays 118.

Figure 2:
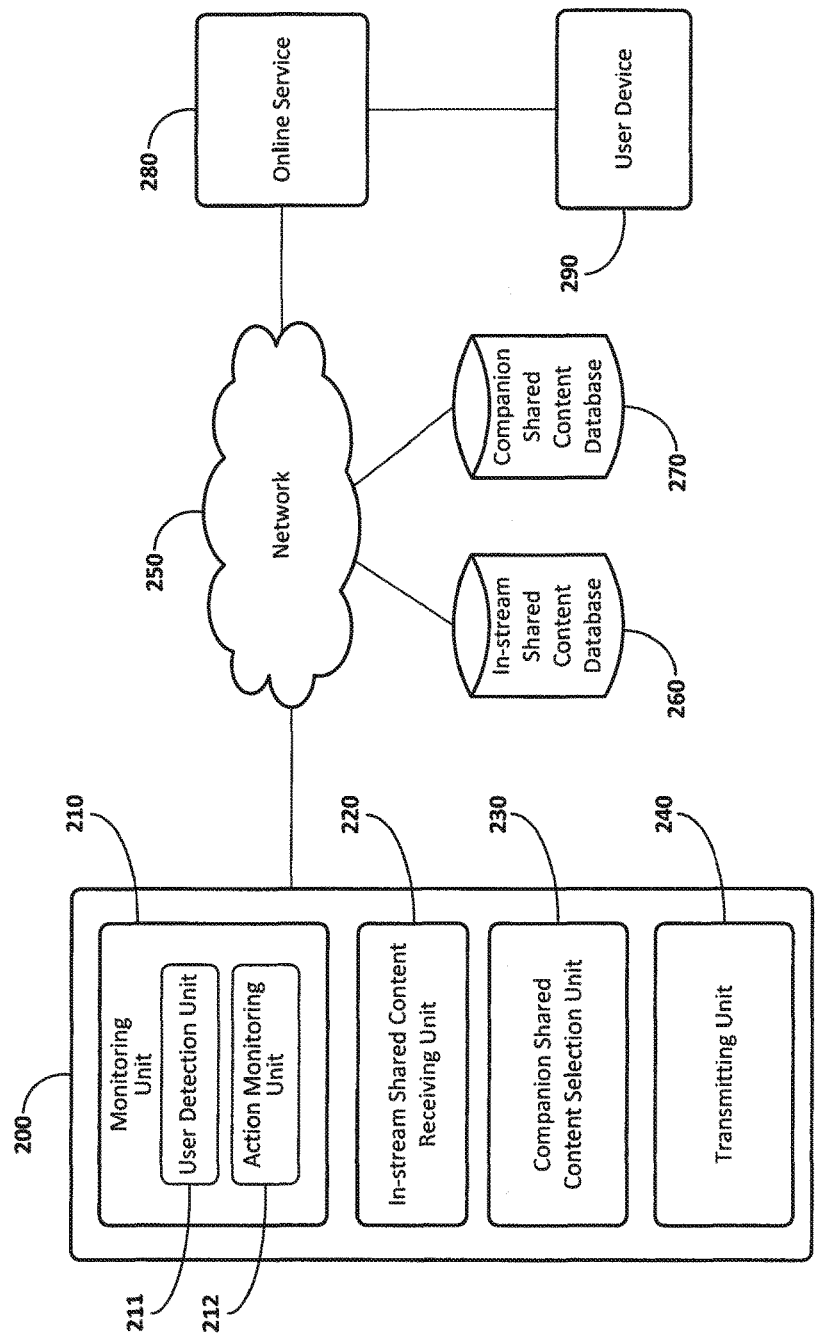
FIG. 2 illustrates an example of a system for adaptively serving companion shared content via an online service.

FIG. 2 illustrates an example of a system 200 for adaptively serving companion shared content. The system 200 includes a monitoring unit 210, in-stream shared content receiving unit 220, companion shared content selection unit 230, and a transmitting unit 240. The system 200 interacts with an online service 280. The online service 280 may be any sort of web site, application, or media sharing service that serves content to a user device 290. For example, a user device 290 may be employed to access the online service 280 to receive content via network 250. The content may be media, such as video, audio, text, or a combination thereof. The online service 280 may provide the content in a streaming format, thereby allowing the user device 290 to access and view the content in real-time.

In addition to serving content, the online service 280 may provide an in-stream shared content (from an in-stream shared content database 260) and companion shared content (from a companion shared content database 270) as well.

The system 200 may be implemented on a distributed storage device, such as a cloud, or on a device such as computer 100.

The monitoring unit 210 monitors activity on the online service 280. The monitoring unit 210 includes a user detection unit 211 and an action monitoring unit 212. The monitoring unit 210 may instigate monitoring any time content is accessed via the online service 280 via a device, such as user device 290.

The user detection unit 211 monitors the user device 290 accessing content via the online service 280. The user of the user device 290 may be logged-in to the online service 280. Alternatively, or in addition to, if the user has given permission to the online service 280, the online service 280 may ascertain the user's identity. Further, online service 280 may store previous activity via the online service 280 by the user or user device 290. Thus, based on the user detection unit 211 monitoring the online service 280, the system 200 may store a record of activity and preferences associated with the specific user or user device 290.

The action monitoring unit 212 monitors an action by the user device 290 for a specific content item being served via the online service 280. For example, if shared content being served in-stream with a content item is skipped, the action monitoring unit 212 makes note of the skipping. Conversely, if the in-stream shared content is watched through its entirety or for longer than a predetermined threshold, the action monitoring unit 212 may record this action by a specific user or user device 290.

The in-stream shared content receiving unit 220 receives information about the in-stream shared content being served with the content. For example, if the content is being served along with an in-stream shared content item directed to a popular new movie, the in-stream shared content receiving unit 220 may record this. The in-stream shared content is sourced from the in-stream shared content database 260. The in-stream shared content receiving unit 220 may receive this information in real-time, thereby allowing the system 200 to adaptively provide companion shared content dynamically.

The companion shared content selection unit 230 selects a companion shared content item to augment a user or user device 290's accessing of content via online service 280. The companion shared content selection unit 230 may retrieve companion shared content from the companion shared content database 270.

The companion shared content selected may be contingent on the monitoring unit 210 and the in-stream shared content receiving unit 220. For example, if the action monitoring unit 212 monitors that the user or the user device 290 does not skip an in-stream shared content served with content (or does not skip the in-stream shared content for at least a predetermined amount of time), the companion shared content selection unit 230 may select companion shared content related to the in-stream shared content.

Conversely, if the user or user device 290 does skip the in-stream shared content, the companion shared content selection unit 230 may select companion shared content based on another metric or rationale.

Another metric or rationale may be a parameter associated with the user or a history of accessing the online service 280 associated with the user device 290. For example, if the user device 290 accesses content related to sports, the companion shared content selection unit 230 may select a companion shared content item directed to sports.

Another rationale may be a theme associated with the user or the user device 290. The theme may simply be a user or user device 290's interaction with another online service that communicates with online service 280 via network 250. For example, if the user or user device 290 is associated with a mapping online service, an application purchasing store, phone numbers, or stored content on the user device 290, the companion shared content selection unit 230 may employ some or all of the above-listed information to select companion shared content from the companion shared content database 270.

The system 200 may be configured to select companion shared content through various combinations of information monitored by the monitoring unit 210. Thus, the companion shared content selected may be based on a combination and weighting of the monitored action of the specific user or user device 290 by the action monitoring unit 212, or information ascertained by the user detection unit 211.

The transmitting unit 240 transmits the companion shared content selected via the companion shared content selection unit 230. The companion shared content selection unit 230 may be configured to transmit the selected companion shared content before the content is served, during the serving of the content or after the content is served. The companion shared content may be presented contingent on the type of the user device 290 being served the content. For example, the companion shared content may be interactive or larger in size based on the user device 290 being a tablet or personal computer. Conversely, if the user device 290 is a smart phone, the companion shared content may be more compact and less data intensive.

Figure 3:
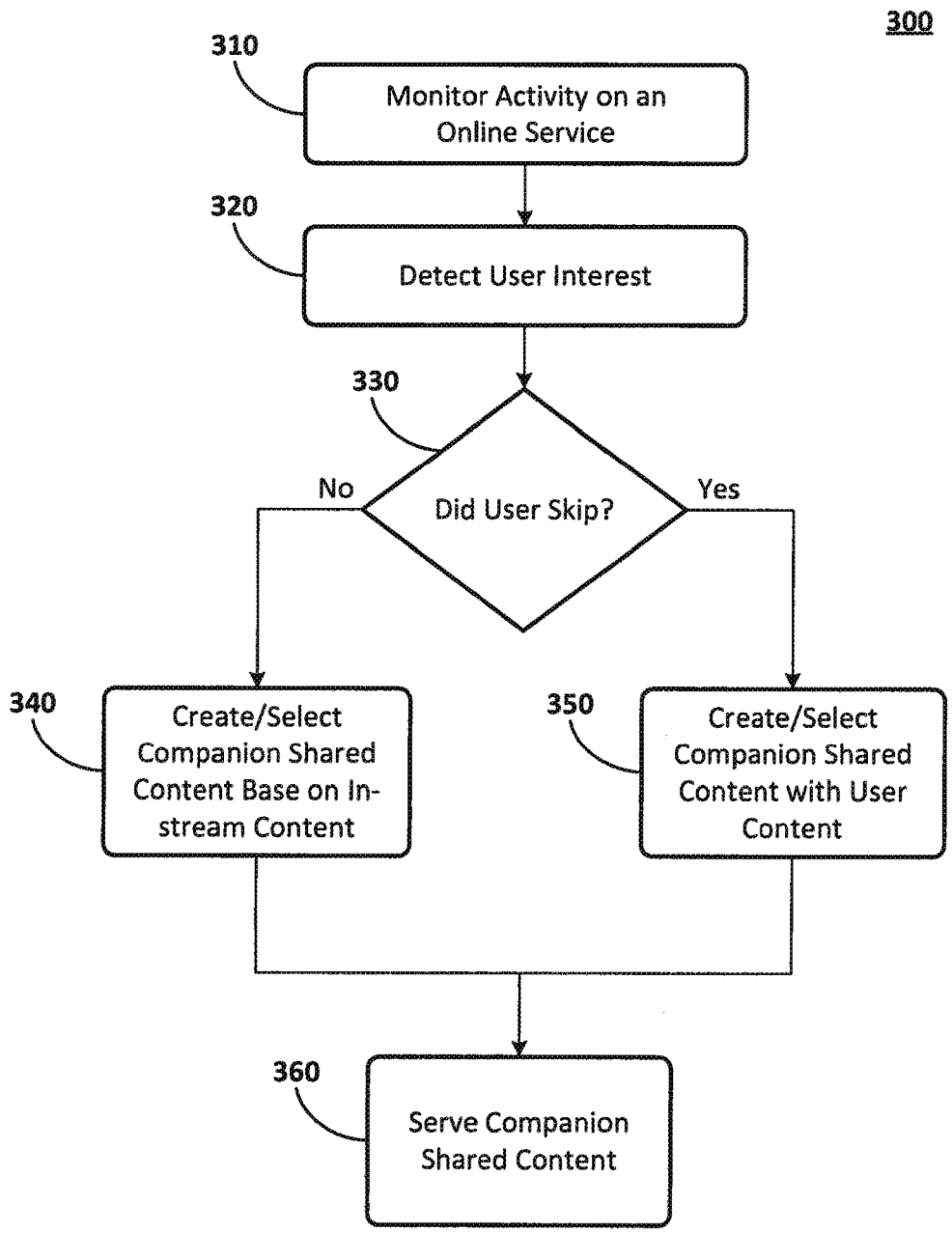
FIG. 3 illustrates an example of a method for adaptively serving companion shared content via an online service.

FIG. 3 illustrates an example of a method 300 for adaptively selection companion shared content. The method 300 may be implemented on a system or a device, such as system 200 described above.

In operation 310, activity is monitored on an online service. Thus, any time content is served via the online service, in operation 310 an indication of the content being served is noted, and method 300 commences. For example, if a user or user device 290 access content on the online service, in operation 310 the access is monitored.

In operation 320, information about the user or user device 290 is detected. For example, the information monitored may be similar to the information detected via the user detection unit 211. Thus, in operation 320, information about the user's or operator of user device 290's preferences and activity may be monitored.

In operation 330, in-stream shared content served along with the content triggering detection in operation 310 is monitored. Specifically, in operation 330 an observation is made as to whether the user or user device 290 skipped the access of the shared content or accessed the shared content in its entirety or for longer than a predetermined threshold.

In operation 340, if the user did not skip accessing the shared content (or accessed in-stream shared content for longer than a predetermined threshold), companion shared content is selected/created based on the in-stream shared content. Thus, the companion shared content may be related to the in-stream shared content, or provide an access to further information associated with the in-stream shared content.

In operation 350, if the user did skip viewing the in-stream shared content, the companion shared content may be selected/created via another rationale. For example, the companion shared content may be selected based on the information obtained in operation 320.

Alternative to the method shown in FIG. 3, operations 320 or 330 may be selectively provided. Thus, the companion shared content may be selected/created based on a combination of the information obtained in operation 320 and the determination made in 330. And conversely, the companion shared content selected/created may be performed based on only one of steps performed in either operations 320 and 330.

In operation 360, the companion shared content is transmitted to a party serving content/in-stream shared content, such as online service 280. In operation 360, the companion shared content may be served in a form contingent on the service or device receiving the companion shared content.

Figure 4A:
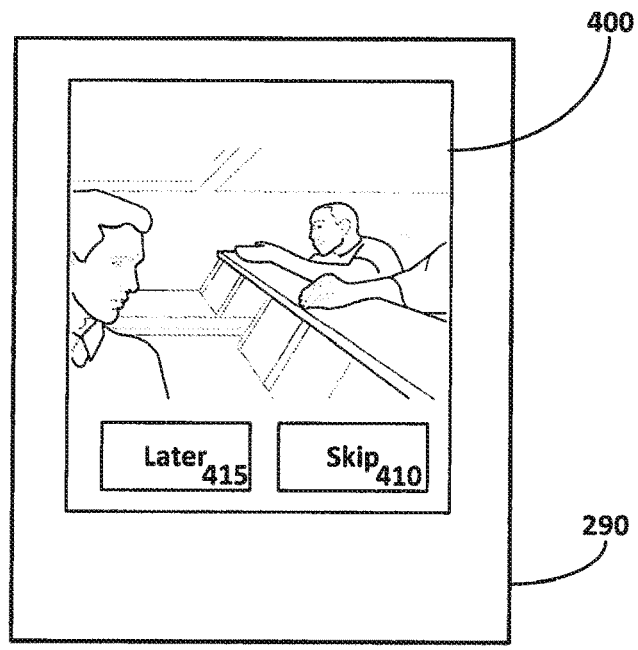
FIGS. 4(*a*) and 4(*b*) illustrate an example of an implementation of the system of FIG. 2.
Figure 4B:
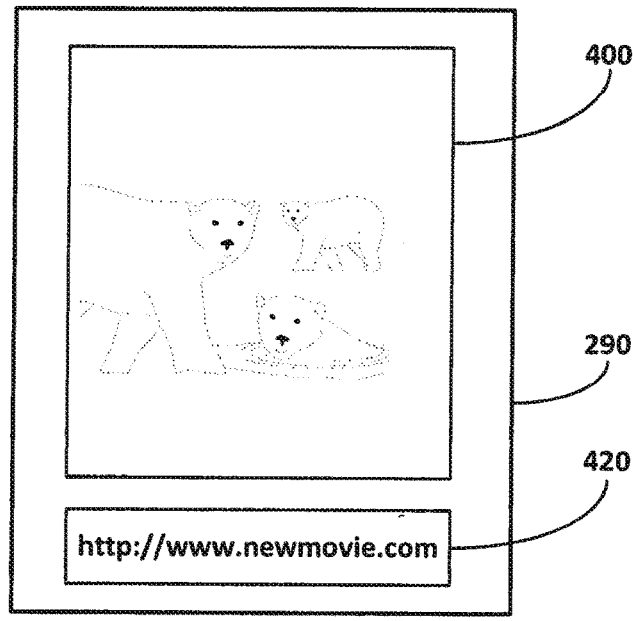

FIGS. 4(*a*) and 4(*b*) illustrate an example of an implementation of the system 200.

Referring to FIG. 4(*a*), user device 290 includes a display 400 of an online service 280. On the display 400, in-stream shared content is being served directed to a new movie. A third-party may have requested the online service 280 to direct various users of the online service 280 to be served with this in-stream shared content.

The display 400 also includes a skip button 410 selectively displayed during the serving of the shared content. The skip button 410, in response to being asserted or requested, allows the user viewing the shared content to not be served the shared content in its entirety. The online service 280 may provide the skip button 410 to ensure that users who are not interested in the shared content are not served the shared content in its entirety. By allowing the users to skip shared content that the user is not interested in, the user is incentivized to maintain activity via the online service 280.

Additionally, or alternatively to, the display 400 may include a later button 415. In this instance, if the user asserts the later button 415, the online service 280 makes note of this assertion. The later button 415 allows the user to indicate that the user is interested in the subject matter of the in-stream shared content.

Referring to FIG. 4(*b*), the display 400 now serves the content the user intended to access (or was directed to by online service 280). For example, if via the user device 290 specific content is searched for or accessed; the specific content is displayed on display 400. Display 400 may be an embedded player provided by the online service 280 that serves content in a format similar to or compatible with the in-stream shared content shown in FIG. 4(*a*).

In another part of the user device 290, such as an area around the display 400, the user device 290 displays companion shared content 420. In the case shown in FIG. 4(*b*), the user in FIG. 4(*a*) did not skip the shared content (or watched the shared content for at least a predetermined threshold time), or asserted the later button 415. Thus, the companion shared content 420 is related to the in-stream shared content shown in FIG. 4(*a*). As shown in FIG. 4(*b*), the companion shared content 420 is a link directed to a web site about the new movie video trailer shown in FIG. 4(*a*).

Although not shown, if the user had skipped the shared content by asserting skip button 410, the companion shared content 420 selected may not be related to the in-stream shared content shown in FIG. 4(*a*). As explained above with reference to system 200 and method 300, a different rationale for selecting companion shared content 420 may be employed, such as a preference associated with the operator of user device 290 or a history of activity associated with the user device 290.

Thus, by adaptively serving companion shared content based on a user device's interaction with an online service, the online service ensures that information pertinent to a specific user is delivered and served to the user. In cases where an online service monetizes the serving of shared content to various users, because the shared content is more relevant to the user (based on monitored and perceived interests), the online service may achieve greater return on investment of served companion shared content due to the companion shared content making a greater impression on the user of a user device accessing the online service.

Certain of the devices shown in FIG. 1 include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAMs) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a number of flow charts and accompanying descriptions to illustrate the embodiments represented in FIG. 3. The disclosed devices, components, and systems contemplate using or implementing any suitable technique for performing the steps illustrated in these figures. Thus, FIG. 3 is for illustration purposes only and the described or similar steps may be performed at any appropriate time, including concurrently, individually, or in combination. In addition, many of the steps in these flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors. A computer storage medium can be, or can be included in, a computer-readable storage device, a computer-readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor can include special purpose logic circuitry, e.g., an FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

To provide for interaction with an individual, the herein disclosed embodiments can be implemented using an interactive display, such as a graphical user interface (GUI). Such GUI's may include interactive features such as pop-up or pull-down menus or lists, selection tabs, scannable features, and other features that can receive human inputs.

The computing system disclosed herein can include clients and servers. A client and server are generally remote from each other and typically interact through a communications network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

What is claimed is:

1. A system comprising:
   a memory;
   a processor, coupled to the memory, to:

provide, via an online service, media content for consumption by a user of a user device, wherein the media content is provided for playback within a media player of the user device;

provide in-stream content to the user device for automatic playback within the media player of the user device without the playback of the media content;

receive an indication of user interaction with the in-stream content that is automatically played back within the media player of the user device without the playback of the media content; and select companion content to send to the user device based on the indication of user interaction, wherein the companion content is unrelated to the in-stream content and is selected responsive to the indication of user interaction suggesting that the user is uninterested in the in-stream content.

2. The system of claim 1, the processor further to:
cause the selected companion content to be transmitted to the user device for display.

3. The system of claim 1, wherein the in-stream content is to display within the media player prior to a display of the media content.

4. The system of claim 1, wherein to select the companion content that is unrelated to the in-stream content, the processor further to:
select the companion content based on at least one of prior user activity, user preferences, or user history.

5. The system of claim 1, wherein to select companion content to send to the user device based on the indication of user interaction, the processor further to:
responsive to the indication of user interaction representing that the user is interested in the in-stream content, select the companion content that is related to the in-stream content.

6. The system of claim 1, wherein to select the companion content to send to the user device based on the indication of user interaction, the processor further to:
responsive to the indication of the user interaction with the in-stream content representing that the user has consumed the in-stream content for a time period longer than a threshold amount, select the companion content that is related to the in-stream content.

7. The system of claim 1, wherein to select the companion content to send to the user device based on the indication of user interaction, the processor further to:
responsive to the indication of the user interaction representing that the user has consumed the in-stream content for a time period less than a threshold amount, select the companion content that is unrelated to the in-stream content.

8. The system of claim 1, wherein the companion content is to display outside the media player of the user device.

9. The system of claim 1, wherein to select the companion content to send to the user device based on the indication of user interaction, the processor further to:
select the companion content that is related to the in-stream content responsive to the indication of the user interaction with the in-stream content representing that the user has consumed the in-stream content for a time period equal to a threshold amount.

10. The system of claim 1, the processor further to:
monitor the user interaction associated with the in-stream content.

11. A non-transitory computer-readable medium comprising instruction that, responsive to execution by a processor, cause the processor to perform operations comprising:

providing, via an online service, media content for consumption by a user of a user device, wherein the media content is provided for playback within a media player of the user device;

providing in-stream content to the user device for automatic playback within the media player of the user device without the playback of the media content;

receiving an indication of user interaction with the in-stream content that is automatically played back within the media player of the user device; and selecting, by the processor, companion content to send to the user device based on the indication of user interaction, wherein the companion content that is unrelated to the in-stream content is selected responsive to the indication of user interaction suggesting that the user is in the in-stream shared content.

12. The non-transitory computer-readable medium of claim 11, wherein selecting the companion content to send to the user device based on the indication of user interaction further comprises:
responsive to the indication of user interaction representing that the user is interested in the in-stream content, selecting the companion content that is related to the in-stream content.

13. The non-transitory computer-readable medium of claim 11, wherein selecting the companion content to send to the user device based on the indication of user interaction further comprises:
responsive to the indication of the user interaction with the in-stream content representing that the user has consumed the in-stream content for a time period longer than a threshold amount, selecting the companion content that is related to the in-stream content; and
responsive to the indication of the user interaction representing that the user has consumed the in-stream content for a time period less than the threshold amount, selecting the companion content that is unrelated to the in-stream content.

14. A method, comprising:
providing, via an online service, media content for consumption by a user of a user device, wherein the media content is provided for playback within a media player of the user device;

providing in-stream content to the user device for automatic playback within the media player of the user device without the playback of the media content;

receiving an indication of user interaction with the in-stream content that is automatically played back within the media player of the user device without the playback of the media content; and selecting, by a processor, companion content to send to the user device based on the indication of user interaction, wherein the companion content that is unrelated to the in-stream content is selected responsive to the indication of user interaction suggesting that the user is uninterested in the in-stream content.

15. The method of claim 14, wherein selecting the companion content to send to the user device based on the indication of user interaction comprises:
responsive to the indication of user interaction representing that the user is interested in the in-stream content, selecting the companion content that is related to the in-stream content.

16. The method of claim 14, wherein selecting the companion content to send to the user device based on the indication of user interaction comprises:

responsive to the indication of the user interaction with the in-stream content representing that the user has consumed the in-stream content for a time period longer than a threshold amount, selecting the companion content that is related to the in-stream content; and responsive to the indication of the user interaction representing that the user has consumed the in-stream content for a time period less than the threshold amount, selecting the companion content that is unrelated to the in-stream content.

\* \* \* \* \*